Sept. 30, 1958          B. PUZINE          2,853,722
TOOL FOR FORMING AND SECURING SINKER TO FISHERMAM'S LINE
Filed Aug. 29, 1957
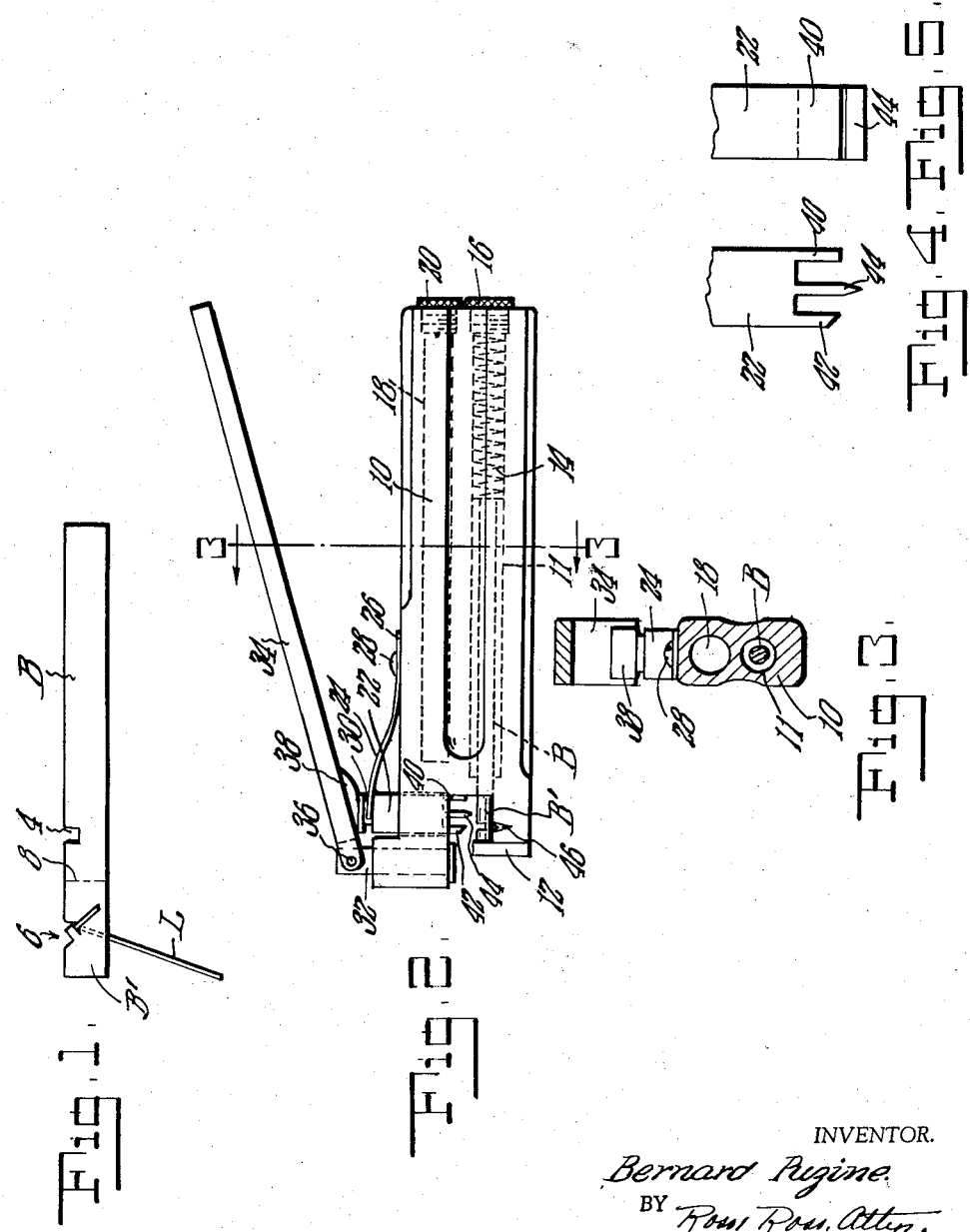
INVENTOR.
Bernard Puzine,
BY

United States Patent Office 2,853,722
Patented Sept. 30, 1958

2,853,722

TOOL FOR FORMING AND SECURING SINKER TO FISHERMAN'S LINE

Bernard Puzine, Easthampton, Mass.

Application August 29, 1957, Serial No. 681,095

4 Claims. (Cl. 7—5.4)

This invention relates to new and useful improvements in tools and is directed more particularly to tools for securing a sinker to a fisherman's line.

The principal object of the invention is directed to the provision of a tool which is constructed and arranged to secure a sinker portion of a rod or bar of sinker material to a fisherman's line, and to sever said portion from said bar.

It is common practise for fishermen to secure rather small sinkers to various points along their lines. Such sinkers usually have grooves for the lines, and being formed from rather soft metal, such as lead, the groove is closed on the line to secure the sinker in place. It is usual for the fisherman to close the groove by means of the teeth but this procedure is objectionable for many reasons.

The place or places along the line where a sinker or sinkers is required depends on the wind, current flow and other factors so that the location of sinkers along the line is or are seldom, if ever, known in advance and the required sinker location and number of sinkers are subject to frequent change at the location of fishing.

According to the novel features of this invention, a tool is provided which is characterized by a means for holding a bar or rod of sinker forming material, such as lead. The bar is fed forwardly against a stop so as to provide a sinker forming free end. A forming member for operating on the free end of the bar is provided with a portion for forming a line groove in the bar, a portion for cutting the bar outwardly of the groove to provide the sinker, and a portion for swedging the bar adjacent a groove previously formed so as to secure the cut off sinker on the line.

By means of the tool, it is possible to quickly and easily secure a sinker or sinkers to the desired location or locations along the line and obviate the necessity of the fisherman carrying a supply of separate small sinkers which are likely to be lost, and at best are difficult to handle and secure to the line.

Various changes and modifications may be made in the form of apparatus embodying the novel features of the invention which for purposes of disclosure will be described in the form at present preferred.

In the drawings:

Fig. 1 is an enlarged side elevational view of a bar of sinker material to explain the invention;

Fig. 2 is a side elevational view of a tool embodying the novel features of the invention;

Fig. 3 is a sectional elevational view on the line 3—3 of Fig. 2; and

Figs. 4 and 5 are side and front elevational views respectively of the sinker forming member of the tool shown in Figs. 2 and 3.

Referring now to the drawings more in detail, the novel features of the invention will be fully described.

The operation and function of the tool embodying the novel features of the invention will first be described in connection with Fig. 1, wherein a bar or rod of sinker forming material is represented by B. Said bar will be in the neighborhood of one-eighth inch in diameter, and of metal. A rod of relatively soft lead will serve for the practise of the invention.

The bar is fed forwardly in the tool by spring means so that its outer extremity abuts a stop thereby providing a free end for the action of a forming and cutting member.

The member has groove forming, swedging, and cutting portions or elements to operate simultaneously on the outer free end B' of the bar B to form a sinker and secure it to a fish line.

The groove forming element forms a groove 4 in the bar for a line, as shown in Fig. 1. The swedging element displaces metal of the bar at 6 adjacent a groove formed in a previous operation of the tool, and over a line L in said groove to secure the line therein. The cutting element cuts through the bar on a line 8 between the groove being formed and the swedged groove so that a sinker is provided which is secured to the line L. The bar B is then advanced to the stop 12 and has a line groove 4 therein.

An elongated body is shown at 10 which is provided with a longitudinal bore 11 for the bar B of sinker material. A stop 12 is provided which is spaced from the outlet end of the bore, and a spring 14 in the bore 11 feeds the bar forwardly against the stop to provide a free end portion B' of the bar. A threaded cap 16 closes the outer end of the bore.

A bore 18 is provided in the body for a supply of bar material and is closed by a threaded cap 20.

A sinker forming member 22 is reciprocable in the body on an axis disposed transversely relative to the axis of the bore 11. Said member is urged upwardly by a spring 24 having an end 26 secured to the body in some suitable manner, as by a screw 28. The upper end of the spring is disposed in a groove 30 of the member 22.

A member 32 which may be pivoted in the body has the forked end of an operating lever 34 pivoted thereto at 36.

The lever 34 has a portion 38 engageable with the upper end of member 22. Said lever may be otherwise formed to engage and depress member 22 against spring 24, as the lever is swung downwardly towards the body.

The member 22 has a groove forming portion 40 for forming the groove 4 in the free end B' of bar B, a swedging portion 42 for swedging the portion 6 of the free end B' of the bar, and a cutting portion 44 for severing the free end portion of the bar on the line 8, all as clearly shown in Figs. 4 and 5.

In describing the operation of the tool, it will be assumed with reference to Fig. 2 that a sinker has been secured to a line and cut from the free end of the bar. In that operation, a line groove such as 4 was formed in the free end of the bar.

A line is guided in a notch 46 of the body into and through the groove 4 of the free end B' of the bar.

The line, being guided in the notch 46, is more easily led over the curved surface of the bar and into the transverse groove on the top side thereof.

The operating lever 34 is swung downwardly against the action of spring 24 to depress member 22.

The portion 40 of member 22 forms a groove 4 in that portion of the bar which will be the next subsequent sinker to be cut from the bar. The swedging portion 42 acts on the bar adjacent a groove 4 previously formed therein to displace metal of the bar into the groove 4 thereby to secure the line in said groove, and the portion 44 cuts off the sinker which is now secured to the line.

Subsequently, the bar is fed outwardly by the spring means to provide an end portion for the next subsequent sinker which will have a line groove 4 therein.

The portions 40, 42 and 44 of the member 22 may be formed as desired for forming the line groove, swedging the outer end of the bar, and for cutting off a sinker from the bar. The lever may take any desired form for operating the member 22 against the action of the spring which swings the lever upwardly when released.

Various changes may be made in the form of the tool to adapt it for the intended purpose without departing from the spirit and scope of the invention, and it is desired to be limited, if at all, by the appended claims rather than by the foregoing description.

I claim:

1. A tool comprising in combination, a body having an elongated bore for a rod of sinker material, spring means for urging said material outwardly from said bore, stop means for the outer end of said rod, a single member depressible in said body transversely to said bore and having a portion for sinking a groove for a fish line in said rod, a portion for cutting off a sinker from said rod, and a portion for crimping said rod to grip a line in a groove.

2. A tool comprising in combination, an elongated body provided with a longitudinally extending bore for an elongated rod of sinker forming material, a stop spaced from an outlet end of said bore, spring means for feeding a rod of sinker material along said bore with the extremity of said rod against said stop providing a free end of said rod between said stop and outlet of said bore, a member reciprocable in said body transversely of said bore and having an end for operating on the free end of a rod in said bore to form a sinker, means for depressing said member in sinker forming direction, and means for reciprocating said rod in non-operating direction, said member end having a portion for forming a groove for a line in the free end of said rod, a cutter on said member end for severing said free end of said rod at a point outwardly of said groove portion, and a portion outwardly of said cutter for swedging the free end of the rod adjacent a groove therein to secure a line in said groove.

3. A tool comprising in combination, an elongated body provided with a longitudinally extending bore for a rod of sinker forming material and having an outlet end at an end portion of the body, a stop carried by said body outwardly from said end portion and the outlet end of said bore providing a space, spring means for urging a rod of sinker material along said bore with the extremity thereof against said stop thereby providing a free end of said rod between said outlet and stop and in said space, a member reciprocable in said body in operating and non-operating directions on an axis transverse to the longitudinal axis of said bore and having a forming end for acting on the free end of a rod in said space, said forming end having; a portion for swedging a portion of the free end of said rod adjacent a line groove therein, a portion for cutting off an outer portion of the free end of said rod, and a portion for forming a line groove in said free end inwardly of said cut off portion of the rod.

4. A tool comprising in combination, an elongated body provided with a longitudinally extending bore for a rod of sinker forming material and having an outlet end at an end portion of the body, a stop carried by said body outwardly from said end portion and the outlet end of said bore providing a space, spring means for urging a rod of sinker material along said bore with the extremity thereof against said stop thereby providing a free end of said rod between said outlet and stop and in said space, a member reciprocable in said body in operating and non-operating directions on an axis transverse to the longitudinal axis of said bore and having a forming end for acting on the free end of a rod in said space, said forming end having; a portion for swedging a portion of said rod adjacent a line groove into said groove for securing a line therein, a portion for forming a line groove in said rod at a distance from said line groove, and a portion for severing said rod intermediate said grooves.

References Cited in the file of this patent

UNITED STATES PATENTS

| 2,765,686 | Deline | Oct. 9, 1956 |
| 2,806,229 | Pletz | Sept. 17, 1957 |